United States Patent [19]
Carlson

[11] 3,759,592
[45] Sept. 18, 1973

[54] MEMORY DISC DRIVE SPINDLE

[75] Inventor: Jerome Albert Carlson, Woodside, Calif.

[73] Assignee: Bearings, Seals & Gears, Inc., Redwood City, Calif.

[22] Filed: Mar. 24, 1972

[21] Appl. No.: 237,773

[52] U.S. Cl. .......... 308/187
[51] Int. Cl. .......... F16c 33/66
[58] Field of Search .......... 308/187, 207 A, 189 A

[56] References Cited

FOREIGN PATENTS OR APPLICATIONS 230,566 10/1969 U.S.S.R. .......... 308/189
510,362 2/1953 Italy .......... 308/187

*Primary Examiner*—Charles J. Myhre
*Assistant Examiner*—Frank Susko
*Attorney*—Paul D. Flehr et al.

[57] ABSTRACT

A spindle assembly for memory disc drives has a vertical shaft with an integral pulley at one end for belt drive. The other shaft end provides a memory disc mounting surface having a minimum of face wobble and radial run-out. Within a housing the shaft is supported by a pair of ball bearing assemblies pre-loaded back-to-back, the outer ring of one of the bearings engages a locational surface of a retainer ring seated in the housing. Bearings seals contacting the shaft provide a reservoir for lubricant and minimize air leakage through the spindle assembly.

6 Claims, 4 Drawing Figures

MEMORY DISC DRIVE SPINDLE

BACKGROUND OF THE INVENTION

This invention is directed to a spindle assembly and particularly to a spindle assembly for applications such as memory disc drives wherein critical to the operation are minimum face and radial run-outs of the spindle.

The criteria for memory disc drive spindles arise from the problem of providing a spindle assembly that will connect to a stationary base plate of the related data handling unit and furnish a shaft equipped at one end to be driven from a motor and the other end of the shaft being equipped with a precisely formed mounting surface for memory discs of various outer diameters. The spindle assembly, over a long service line on the order of 40,000 operating hours, must have a low face wobble and a low radial run-out to cooperate properly with the magnetic heads of the data handling unit. A clean air environment is maintained about the magnetic heads and disc and consequently, air leakage through the spindle assembly must be minimized.

In the present state of the art spindle drive assemblies it is known to mount separate precision ball bearings on the spindle shaft and in an associated housing. That housing with the bearing and shaft assembly is placed upon the stationary base plate of the disc drive system.

The present invention departs from contemporary prior art structures by providing an integrated bearing-shaft assembly including novel air and lubricant sealing structures to ensure evenness of disc rotary speed and low shaft and spindle run-out.

SUMMARY OF THE INVENTION AND OBJECTS

In summary, the invention concerns a spindle assembly including a shaft member equipped at one end to receive rotative power from an associated drive motor and the other shaft end is equipped to mount a memory disc. The shaft has two spaced apart integral ball bearings raceways and is arranged co-axially within a housing, the inside wall of the housing having a circumferential slot oriented perpendicular to the housing axis. An abutment ring cams into the slot providing a location shoulder for one of two included ball bearing assemblies. A resilient spacer provides a bias between the retainer ring and the other of the ball bearing assemblies supports the shaft axially with respect to said housing while seals contour the ball cage providing a lubricant reservoir and air impedance through the spindle.

An object of the invention is to provide an improved spindle assembly for memory disc drives which has a low face and radial run-out, a long life, and low noise generation characteristics.

Another object of the invention is to provide an improved spindle drive assembly which has low friction torque characteristics to insure positive starting and subsequent running at constant speeds.

Another object of the invention is to provide in a spindle drive assembly a combination ball bearing seal and lubricant reservoir to insure adequate and continuous supply of lubricating medium over a long life of the unit.

Further objects of the invention will appear in connection with the description of the preferred embodiments taken in connection with the drawings.

DESCRIPTION OF THE PREFERRED EMBODIMENTS

Figures 1, 3, 4:
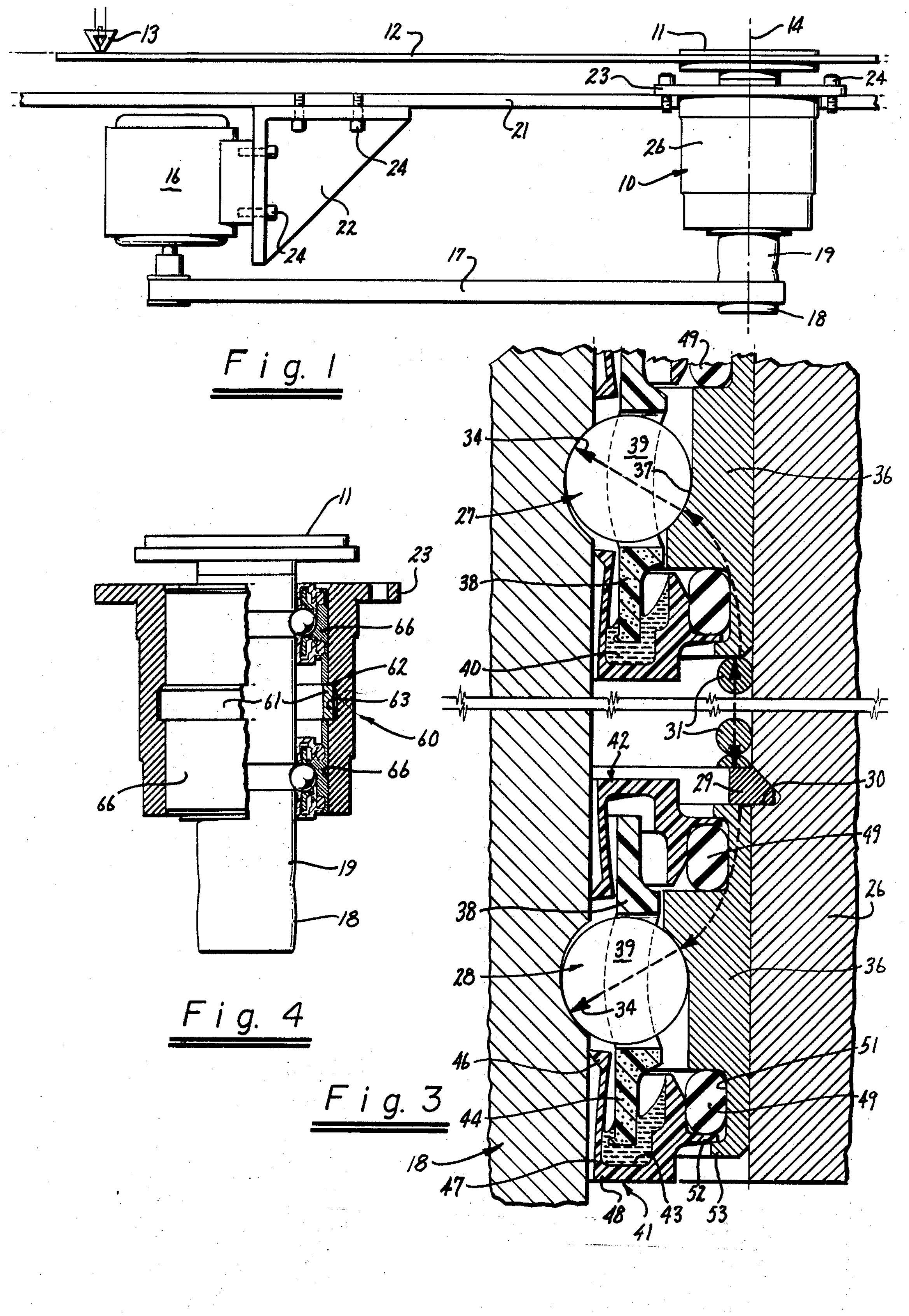
FIG. 1 is an elevational view of a memory disc drive unit illustrating the drive spindle assembly of the present invention particularly in association with a drive motor, a representative memory disc and a transducer head.
FIG. 3 is a fragmentary longitudinal, sectional view showing the ball bearing and seal assemblies of the present invention.
FIG. 4 is a view like FIG. 2 showing another form of the invention with a retaining ring serving as a precision bearing spacer.

In FIG. 1 of the drawings a memory disc drive assembly is illustrated and shows a spindle assembly 10 of the present invention equipped with a disc-flange 11 upon which is mounted a memory disc 12 which cooperates with the transducer head 13 for recording or retrieving data with respect to the disc. The relationship of the head 13 to the disc 12 is critical to satisfactory operation of the data handling machine and thus, it is essential that the disc mounting flange 11 rotate about the axis indicated by the broken line 14 with an absolute minimum of run-out and with a minimum amount of face wobble. A clean air environment (not depicted) is provided to surround the head and disc to minimize contamination by airborne particles. The retention of a clean air atmosphere is encouraged by high air impedance through the spindle assembly 10, this feature being described fully below.

A motor 16 equipped with a pulley 15 drives the spindle assembly 10 through a flat belt 17 which is reeved about an integral shaft pulley formed at a crowned portion 18 at the end of the spindle shaft 19. Both the motor 16 and the spindle assembly 10 are fixedly secured to a base plate 21 of the data handling unit, the motor being carried by an L-shaped bracket 22 and the spindle assembly being secured to the base plate 21 through means of an integral housing collar 23, precisely machined for accurate matching with the base plate 21. Fasteners 24 maintain the parts 16, 21, 22, 23 fixedly secured together in operative association as illustrated in FIG. 1.

Figure 2:
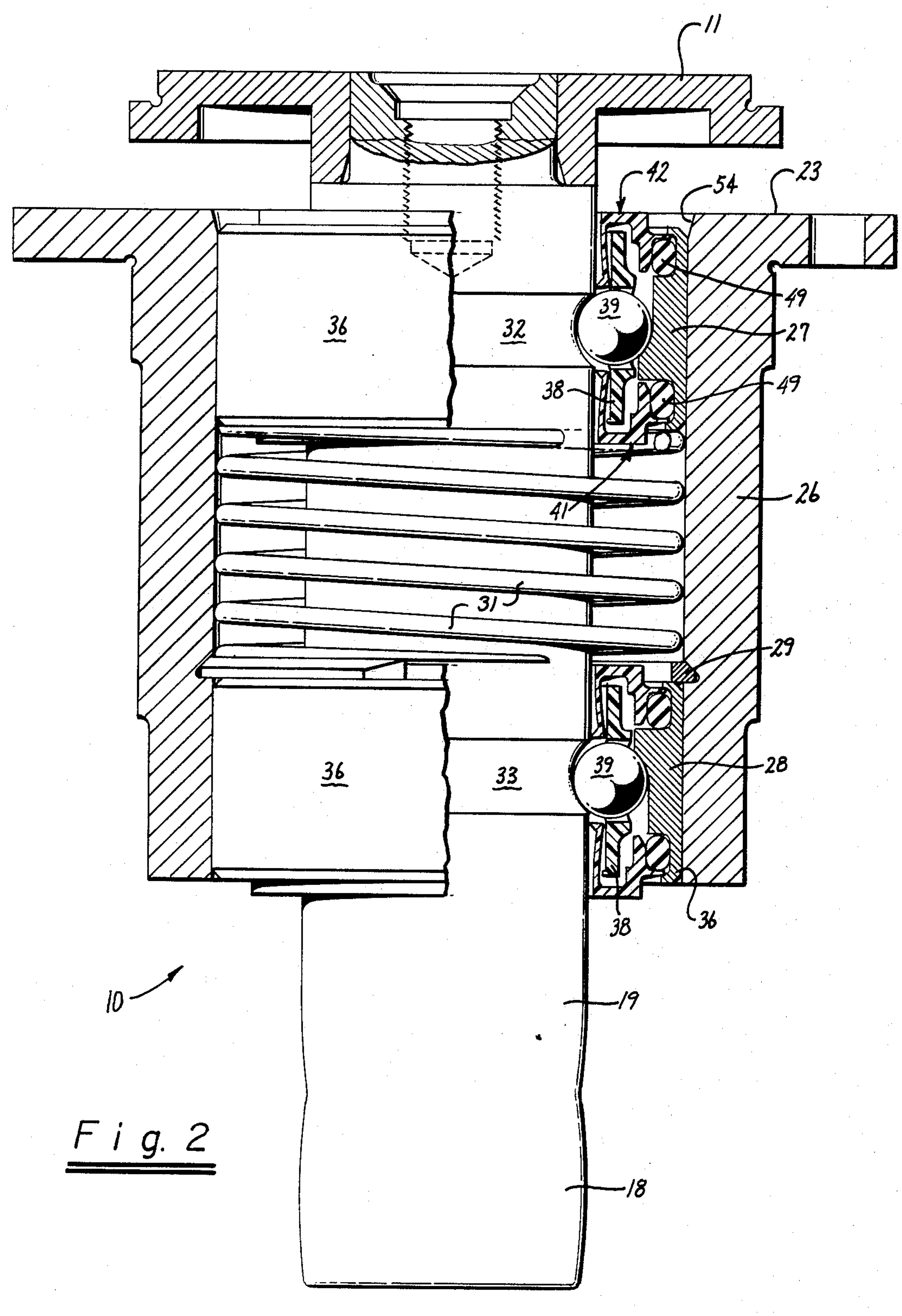
FIG. 2 is an enlarged longitudinal, sectional view of the drive spindle assembly of the present invention.

Referring to FIG. 2 where the spindle assembly 10 is shown in vertical section, it will be seen that the spindle assembly 10 includes a generally cylindrical housing 26 through which extends the spindle shaft 19 which is rotatably supported with respect to the housing by two spaced apart ball bearing assemblies 27 and 28. Along the inside cylindrical wall of the housing, a bevelled circumferential groove 30, oriented normal to the housing axis, furnishes a seat for a retainer ring 29 of split ring configuration. The ring 29 serves to maintain the lower bearing aseembly 28 in an accurately located position by affording a flat radial mounting face for the rim 53 of the bearing outer ring 36 to abut. The retainer 29 is compressed during installation and is thereby sprung radially inwardly to provide a fixed reference plane along the housing axis.

The retainer ring also furnishes an abutment shoulder for one end of a resilient spacer or compression spring 31, the other end of which engages the upper bearing assembly 27 as shown in FIG. 2. The locational groove 30 is bevelled along one wall, as shown in FIGS. 2 and 3, complimentary to the retainer member bevel so that the retainer may cam into the groove. The complimentary bevels also provide a means for disassembly of the unit, as explained below.

It will be seen that the bearing inner raceways 32 and 33 are formed integral with the shaft 19. This arrangement of two spaced apart ball bearings urged apart or pre-loaded by a resilient spacer member is known in the art as back-to-back mounting and provides diverging ball angle of contact lines, as indicated by the arrows 34 in FIG. 3, to provide a stable support for the shaft 19. The force distribution to the bearings from the spring 31 is indicated by the broken lines 35 in FIG. 3.

Each of the ball bearing assemblies 27 and 28 includes an outer ring member 36 which has a ground surface to provide an outer raceway 37, the outer ring fitting against the inside wall of the housing 26. A ball retainer or cage 38 maintains a row of bearing balls 39 in operative association with the inner 32 and outer 37 raceways. The bearing balls and raceways are furnished with lubricant 40 throughout the life of the spindle assembly which may be as long as 40,000 hours from a supply initially installed in a reservoir 43 provided in the bearing seals, each bearing having a lower seal 41 and an upper seal 42 of substantially identical configuration. Each seal 41 and 42 provides an axially opening recess 43 which serves as a reservoir for the lubricant 40 as in the lower seal 41, the unit 10 being illustrated for service in a vertical up position. The ball retainer 38 includes a circumferential skirt element 44 which projects into the lubricant reservoir of the seal. Through a combination of wicking action due to the porous material of the retainer and the centrifugal forces from rotational motion of the cage, the lubricant is urged upwardly from the reservoir into contact with the ball and ball races as suggested in FIG. 3. The retainer member is formed from a porous material and a satisfactory material is Grade L Nema, fine weave linen phenolic conforming to Mil-P-15035-FB1. The cage or ball retainer 38 is symetrical and may perform the lubricating function, in cooperation with the seals, in either the vertical up or down position.

As shown in FIG. 3, each of the bearing seals 41 and 42 maintains a dynamic sealing relationship with the rotatable shaft 18 through an annular lip 46 which engages the shaft. The lip is mounted on the free end of a cylindrical wall 47, the base of which is integral with the seal body 48. Upon installation of the seal to the housing assembly the lip 46 and wall are biased radially outwardly against the inherent resiliency of the seal material which preferably is formed of polytetrafluoroethylene or Teflon, a DuPont trademark. Along the outer periphery, each bearing seal maintains a static sealing relationship with the outer bearing ring 36 by means of an elastomeric O-ring 49 compressed into a cavity 51 of the outer ring by the body portion 48 of the bearing seal upon installation, as shown in FIG. 3. A circumferential collar 52, integral with the seal body, snaps over an inwardly projecting rim 53 of the outer ring so that the O-ring is confined on all four sides as viewed in radial cross-section of FIG. 3.

Assembly of the Unit 10

The spindle assembly 10 in the manufacturing process is put together by first making a sub-assembly of all parts except for the outer housing 26 and then inserting the subassembly into the housing with the pulley end of the shaft being inserted through the collar 23 of the housing. More particularly, the sub-assembly is made up by first taking the shaft 19 with the disc mounting flange 11 already press-fitted and machined on the shaft for precise concentricity and sliding along the shaft one of the upper bearing seals 42 and the O-ring 49. A ball retainer 38 with the balls 39 and the outer ring member 36 is next installed followed by the lower seal 41 and its accompanying O-ring 49. The radially outwardly extending collars 52 of the seals 41 and 42 are urged into place to seat within the rim 53 of the outer ring to occupy the position as shown in FIG. 3. As of this step in the assembly, the O-rings are compressed substantially as illustrated in the drawings and the annular sealing lip 46 engages the shaft 19, as shown, to flex the wall member 47 away from the shaft. The upper bearing assembly 27 is thus suitably arranged with the balls 39 positioned in engagement with the inner 32 and outer 37 raceways.

The resilient spacer member or spring 31 is placed upon the shaft together with the bevelled retainer ring 39. This is followed by placement of the outer ring 36 for the lower bearing assembly together with its associated upper seal 42 and cooperating O-ring 49. The ball retainer 38 together with the ball bearings 39 are installed and the parts are compressed so that the balls seat with respect to the raceways. The lower seal 41 and O-ring are urged along the shaft and its collar 52 is snapped into position within the rim 53 so that the associated O-ring may be compressed as shown in the drawings.

With the shaft and bearings sub-assembly completed, as described above, the sub-assembly is introduced through the collar equipped end of the housing with the chamfer 54 permitting the retainer ring 29 to be radially compressed so that it can be moved along the bore of the housing to cam into and seat within the bevelled groove 30. At this point the assembly is complete and the unit may be tested for compliance with specification as to concentricity and run-out.

To disassemble the unit 10, an axial force is applied normal to the flat face of the retainer ring 19 (or up as viewed in FIG. 2) to cause the ring to compress radially inwardly by camming against the bevelled side wall of the groove 30. Once the ring 29 is free of the groove the housing may be removed from the shaft and bearing sub-assembly.

SECOND PREFERRED EMBODIMENT

FIG. 4 of the drawings illustrates another preferred embodiment 60 of the spindle assembly of the present invention wherein like reference numerals have been used to designate like parts as described above. The spindle assembly 60 differs from the spindle assembly 10, previously described, by the inclusion of a precise spacer member 61 which serves the function of both the split retainer ring 29 and compression spring 31 for locating precisely the upper and lower bearing assemblies.

More particularly, the spacer member 61 is provided with a bevel 62, preferably 45°, along its upper edge to seat against a complimentary surface provided by a groove 63 within the inner wall of the housing. The spacer member may be manufactured of split-ring construction, as is well known in the art, and is designed to have an axial length to fill the space between the upper and lower bearing assemblies and to afford a designed pre-load or controlled clearance so that the angle of ball contact with the inner raceway will divert outwardly providing a stable mounting for the shaft member 19. As shown in FIG. 4, the parts are arranged such that a clearance is provided between the outside cylindrical wall surface of the spacer member 61 and the confronting surface of the groove 63.

As may be seen from FIG. 4, the outer rings 66 of the bearing assemblies are extended axially in an inward direction for engagement with the spacer member 61 although the ring members could be designed as shown in FIG. 2 and the spacer member is elongated to fill the space between the confronting inner faces of the outer bearing rings 66. As was the case with the retainer member 29, axial inward thrust directed at the pulley end of the shaft 19 will cause the spacer member 61 to compress by reason of the camming action of the complimentary bevel surfaces so that the spindle assembly may be disassembled once the spacer member has been unseated from the groove 63. Conversely, the internal forces in the spacer member 61 cause the member to seat in the groove with respect to the confronting upper bevelled surfaces 62 and the lower shoulder surfaces.

The spacer member 61 may comprise a single continuous ring-like member, as illustrated in FIG. 4, or may be made in two parts, viz.: a retaining ring plus a separate spacer, the spacer being either a single split ring or a double split ring, as is well known in the art.

I claim:

1. In a spindle assembly, a shaft member having one end equipped to receive rotative power from a drive assembly and the other end equipped to distribute the driving power, said shaft intermediate its ends being provided with at least two, spaced apart ball bearing raceways, a housing including a chamber having a generally cylindrical inside wall co-axially arranged with respect to said shaft, at least two, spaced apart ball bearing assemblies arranged along the inside wall of said chamber so that the bearing balls operatively engage the ball raceways on said shaft, spacer means disposed intermediate said ball bearing assemblies and including a circumferentially extending slot arranged in a portion of said inside wall, a ring member disposed in said slot, said slot and ring member being provided with complimentary portions arranged at an acute angle so that said ring member cams into said slot, said ring member providing an axially facing, radially inwardly extending, locational surface serving to position accurately one of said bearing assemblies with respect to said housing, and the other end of said spacer means engaging the other of said bearing assemblies serving to support through said bearing assembly said shaft axially with respect to said housing.

2. The spindle assembly of claim 1 wherein said spacer means includes spring means acting between said abutment means and said other one of said bearing assemblies.

3. The spindle assembly of claim 1 wherein at least one of said bearing assemblies includes a rotatable ball retainer having axially extending portions, and sealing means serving to maintain a reservoir of lubricant with respect to said bearing assembly, said sealing means comprising an annular body of resilient material disposed axially to one side of said ball bearings, and including a radially inwardly disposed cylindrical wall mounted at one end thereof to said body, the free end of said cylindrical wall having an inwardly projecting annular sealing lip engaging said shaft, an axially opening, annular recess formed within said seal radially outwardly of said wall serving as a lubricant reservoir, said axially extending portions of said ball retainer projecting axially into said recess for engagement with lubricant therein.

4. The apparatus of claim 3 wherein said ball retainer is formed from a lubricant pervious material affording by wicking action lubricant transfer from said seal reservoir to said bearing balls.

5. In a drive spindle assembly the combination comprising, a housing, a ball bearing and seal assembly arranged in said housing and including a rotatable member having a ball inner raceway extending around an outer surface of said member, an outer member generally stationary with respect to said housing and having a ball outer raceway extending around an inner surface of said member, a ball retainer disposed in a space between said members, a row of ball bearings in said ball retainer and cooperably arranged with respect to said members and operatively disposed in said raceways, sealing means serving to maintain a reservoir of lubricant with respect to said ball bearings and providing impedance to air movement across said bearings, said sealing means comprising an annular body of resilient material disposed axially on one side of said raceways, and including a radially inwardly disposed cylindrical wall mounted at one end thereof on said body, the free end of said cylindrical wall having an inwardly projecting, annular sealing lip engaging said rotatable member, said cylindrical wall and said seal body being radially spaced apart to define an axially opening, annular recess serving as a lubricant reservoir, said ball retainer having portions projecting axially into said recess for engagement with lubricant therein, portions of said seal body and said stationary member defining an annular space, and, resilient, annular sealing means disposed in said annular space and biasing said sealing means radially inwardly towards said rotatable member.

6. The apparatus of claim 5 wherein said ball retainer is formed from a lubricant pervious material affording by wicking action lubricant transfer from said seal reservoir to said bearing balls.

* * * * *